United States Patent
Suzuki

(10) Patent No.: US 7,443,612 B2
(45) Date of Patent: Oct. 28, 2008

(54) COMPACT LARGE APERTURE WIDE-ANGLE LENS AND CAMERA INCLUDING COMPACT LARGE APERTURE WIDE-ANGLE LENS

(75) Inventor: Takashi Suzuki, Higashimurayama (JP)

(73) Assignee: Fujinon Corporation, Saitama (JP)

(*) Notice: Subject to any disclaimer, the term of this patent is extended or adjusted under 35 U.S.C. 154(b) by 668 days.

(21) Appl. No.: 11/142,272

(22) Filed: Jun. 2, 2005

(65) Prior Publication Data
US 2006/0007561 A1 Jan. 12, 2006

(30) Foreign Application Priority Data
Jun. 9, 2004 (JP) .............................. 2004-171404

(51) Int. Cl.
*G02B 9/58* (2006.01)
(52) U.S. Cl. ...................................... 359/782
(58) Field of Classification Search .................. 359/755, 359/761, 770, 782
See application file for complete search history.

(56) References Cited

U.S. PATENT DOCUMENTS

| | | | |
|---|---|---|---|
| 5,398,136 A * | 3/1995 | Ohzawa et al. | 359/714 |
| 5,760,973 A * | 6/1998 | Kawamura | 359/753 |
| 5,805,359 A | 9/1998 | Yamanashi | |
| 5,808,808 A | 9/1998 | Yamanashi | |
| 6,088,172 A | 7/2000 | Sato | |

FOREIGN PATENT DOCUMENTS

| | | |
|---|---|---|
| JP | 9-236746 | 9/1997 |
| JP | 11-326756 | 11/1999 |
| JP | 2000-321490 | 11/2000 |
| JP | 2001-124985 | 5/2001 |
| JP | 2002-277733 | 9/2002 |

* cited by examiner

*Primary Examiner*—Darryl J Collins
(74) *Attorney, Agent, or Firm*—Arnold International; Jon W. Henry; Bruce Y. Arnold

(57) ABSTRACT

A large aperture wide-angle lens includes, arranged in order from the object side, a first lens group having negative refractive power, a second lens group having positive refractive power, a stop, a third lens group having positive refractive power, and a fourth lens group having negative refractive power. The first lens group is formed of one lens element, and the second lens group is formed of one or two lens elements. Each of the third and fourth lens groups includes at least one aspheric surface and each may be formed of two lens components that are lens elements. The wide-angle lens preferably satisfies specified conditions related to f-number, focal length and back focal length of the wide-angle lens, focal lengths of the first and fourth lens groups, maximum image height at the image surface, and indexes of refraction and Abbe numbers of particular lens elements.

20 Claims, 5 Drawing Sheets

COMPACT LARGE APERTURE WIDE-ANGLE LENS AND CAMERA INCLUDING COMPACT LARGE APERTURE WIDE-ANGLE LENS

FIELD OF THE INVENTION

The present invention relates to an optimally miniaturized large aperture wide-angle lens suitable for use as an imaging lens in cameras, particularly photographic cameras using photosensitive silver salt film.

BACKGROUND OF THE INVENTION

Generally, with lenses used in compact cameras, the back focus is short, and it is important that the length of the retracted body be short and that the lens diameter be small. Compact imaging lenses for mounting in compact cameras that use photographic film are disclosed, for example, in Japanese Laid-Open Patent Applications H9-236746, H11-326756, 2000-321490, and 2001-124985. The lenses described in these applications satisfy the conditions of short back focal length, short length when retracted, and a small lens diameter. For example, the lens described in Japanese Laid-Open Patent Application H9-236746 includes four lens components that, from the object side, have negative, positive, positive and negative refractive powers, providing a compact large aperture wide-angle lens with excellent performance when implemented in an F2.8, 28 mm focal length imaging lens.

For the type of lenses described above, a high performance lens is desirable, which calls for a large aperture and a larger field angle than in the prior art lenses. Particularly, in recent years, for cameras using silver salt film, there has been a desire to take pictures with the same brightness as that of the human eye, notwithstanding distance or whether or not auxiliary light is present. As a result, there has been rapid development of compact lenses which are bright and have good aberration correction.

BRIEF SUMMARY OF THE INVENTION

The present invention relates to a large aperture wide-angle lens of compact construction, with a small number of lens components and lens elements, with a small lens diameter and a short back focus, with a wider angle of view, with improved brightness, and with excellent performance. The present invention further relates to a camera using such a large aperture wide-angle lens as an imaging lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transverse to the optical axis of the lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing lens elements together.

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
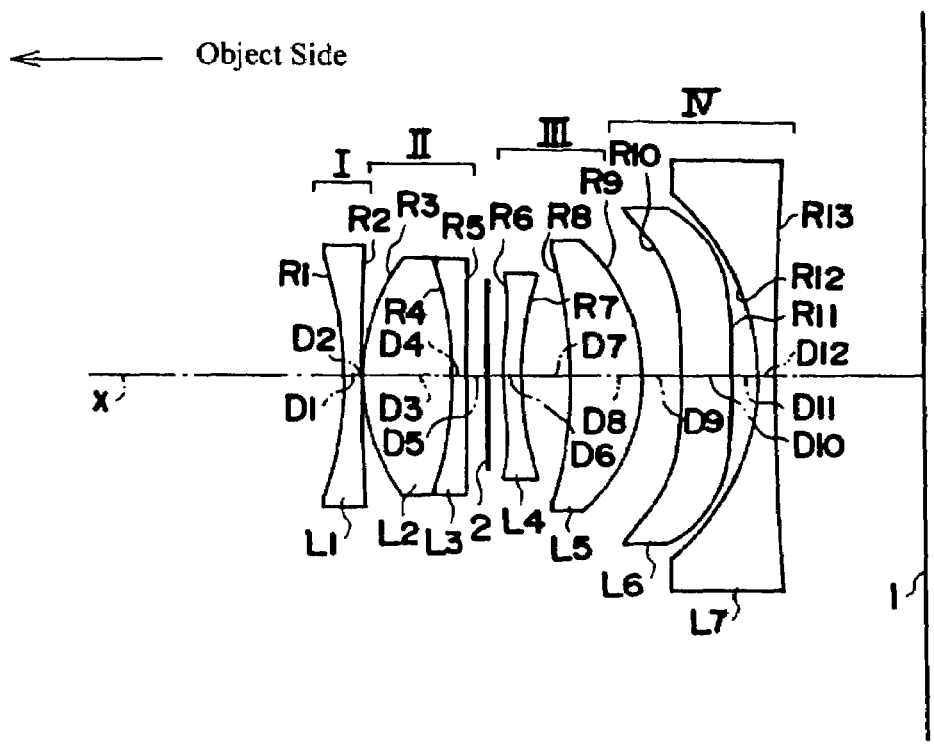
FIG. 1 shows a cross-sectional view of the large aperture wide-angle lens of Embodiment 1 of the present invention.

A general description of the lens of the present invention that pertains to disclosed embodiments of the invention will now be described with reference to FIG. 1 that shows Embodiment 1. A horizontal arrow at the upper left of FIG. 1 that points left indicates the object side of the lens. In FIG. 1, lens elements are referenced by the letter L followed by a number denoting their order from the object side of the lens along the optical axis X, from L1 to L7. Similarly, the radii of curvature of the optical surfaces are referenced by the letter R followed by a number denoting their order from the object side of the lens, from R1 to R13 in FIG. 1, as well as in FIG. 2 that shows Embodiment 2 (but from R1 to R12 in FIG. 3 that shows Embodiment 3). The on-axis surface spacings along the optical axis X of the various optical surfaces are referenced by the letter D followed by a number denoting their order from the object side of the lens, from D1 to D12 in FIG. 1, as well as in FIG. 2 that shows Embodiment 2 (but from D1 to D11 in FIG. 3 that shows Embodiment 3). In a similar manner, four lens groups are labeled I, II, III, and IV in order from the object side of the lens, and the lens elements and lens components belonging to each lens group are indicated by brackets adjacent the labels I-IV. Also shown in FIG. 1 is a stop 2, such as diaphragm, that controls the amount of light passing through the large aperture wide-angle lens that forms an image on an image plane 1 at the right of FIG. 1.

As shown in FIG. 1, the large aperture wide-angle lens of the present invention includes, in order along the optical axis X from the object side, a first lens group I having negative refractive power, a second lens group II having positive refractive power, a third lens group III having positive refractive power, and a fourth lens group IV having negative refractive power. Also, the first lens group I includes a lens element having negative refractive power and having a concave surface on the object side of the first lens group I, and this concave surface has a curvature larger in absolute value than the absolute value of the curvature of the surface on the opposite side of this lens element, which may relate to both surfaces being concave. More preferably, the first lens group includes only a single lens element (lens element L1 as shown in FIG. 1). Also, the second lens group II includes no more than two lens elements, no more than one of which has positive refractive power, and includes a convex surface on the object side.

Additionally, the third lens group III includes at least one aspheric surface and an image-side lens component having positive refractive power that has a convex image-side surface. Furthermore, the fourth lens group IV has a concave object-side surface and includes at least one aspheric surface.

In order to become symmetrical with the negative and positive refractive powers of the first lens group I and the second lens group II, the refractive powers of the third lens group III and the fourth lens group IV are arranged to be positive and negative, respectively, and various specific lens component and lens element shapes are chosen in all four lens groups. Through the effective aberration correction of the aspheric surfaces included in the third lens group III and the fourth lens group IV, the large aperture wide-angle lens, even with the large aperture and wide-angle specified, can obtain high optical performance with a compact construction. Moreover, between the second lens group II and the third lens group III, the principal rays of the peripheral optical flux are established to be near to the optical axis in close proximity to a desired location of a stop or diaphragm. By arranging the stop so that the refractive powers of the first lens group I, the second lens group II, the third lens group III, and the fourth lens group IV become symmetrical about the stop, good optical performance can be obtained.

Furthermore, the large aperture wide-angle lens of the present invention preferably satisfies the following Conditions (1) and (2):

$1.7 < F_{NO} < 2.8$            Condition (1)

$0.77 < Y/f < 1.1$            Condition (2)

where $F_{NO}$ is the f-number of the large aperture wide-angle lens;

Y is the maximum image height at the image plane of the large aperture wide-angle lens; and f is the focal length of the large aperture wide-angle lens.

If the upper limit of Condition (1) is not satisfied, the requirements of a large aperture will not be met; on the other hand, if the lower limit of Condition (1) is not satisfied, the aperture will become so large that correction of spherical aberration becomes difficult. If the upper limit of Condition (2) is not satisfied, the field angle (i.e., the field of view) will be so large that adequate correction of aberrations will be impossible. On the other hand, if the lower limit of Condition (2) is not satisfied, the lens will not have an adequately wide field of view. By satisfying both Conditions (1) and (2), good optical performance can be achieved with a compact construction.

In addition, in the case where the second lens group II is constructed with two lens elements, the second lens group II is preferably formed of, arranged in order along the optical axis from the object side, a lens element having positive refractive power and a lens element having negative refractive power that is cemented to the lens element having positive refractive power (lens elements L2 and L3 as shown in FIG. 1). In the large aperture wide-angle lens of the present invention, an optical flux having a large angle of incidence from the periphery of the field, if totally reflected by a lens surface, has a negative influence on optical performance. By using cemented lenses, the reflection can be entirely prevented.

Additionally, the third lens group III preferably includes only the following lens components, arranged in order along the optical axis from the object side: a lens component of negative refractive power that includes an aspheric surface; and a lens component of positive refractive power (that may be either meniscus shaped or biconvex) with its surface on the image side being convex and having a curvature that is stronger (i.e., larger in absolute value) than the curvature of its surface on the object side. Preferably, the lens component of positive refractive power has a meniscus shape. Even more preferably, each lens component is a lens element (as shown by lens elements L4 and L5 in FIG. 1). In order to create a compact lens system, it is important that both the number of lens components and the number of lens elements be minimized. The two-component construction of lens group III described above helps achieve compactness. Moreover, using only two lens elements further simplifies the construction and aids the compactness without causing a deterioration of optical performance.

Furthermore, by making a surface of the object-side lens component of the third lens group III to be aspheric such that the refractive power of this lens component becomes more negative toward the periphery, effective correction can be made of several aberrations produced by the image-side surface (that is convex and of stronger curvature than the object-side surface) of the image-side lens component of the third lens group III. Such correction is especially needed when the image-side lens component of the third lens group is a meniscus lens element. In this manner, it becomes possible to accomplish favorable correction of spherical aberration.

Additionally, preferably the fourth lens group IV includes only the following lens components, arranged in order along the optical axis from the object side: a lens component that includes an aspheric surface; and a lens component of negative refractive power (that may be biconcave) with a concave object-side surface having a refractive power of absolute value greater than the absolute value of the refractive power of the image-side surface. More preferably, the fourth lens group includes only two lens elements (i.e., lens elements L6 and L7, as shown in FIG. 1). As in the case of the third lens group III, this two-component construction prevents deterioration of the optical performance in a compact large aperture wide-angle lens. Also, the object-side lens component may have either positive or negative refractive power, and, in either case, may have only a small amount of optical power.

Furthermore, by constructing the object-side lens component of the fourth lens group IV so that it includes an aspheric surface for which the refractive power becomes less negative or more positive toward the periphery, effective correction can be made of several aberrations generated by the highly concave surface on the object side of the image-side lens component of the fourth lens group IV. Particularly, it becomes possible to favorably correct spherical aberrations. The object-side lens component of the fourth lens group IV may be made so that only one surface thereof is an aspheric surface in order to obtain desired properties, but if both surfaces are aspheric surfaces, the desired properties may be obtained to a higher degree. In addition, it is desirable that each lens element of the fourth lens group IV that has an aspheric surface be made of plastic. Using plastic enables an aspheric surface to be formed inexpensively and reduces the weight of the lens element. Because the object-side lens component of the fourth lens group IV has a relatively large aperture within the lens system, using plastic to form this lens component is especially desirable.

In addition, the large aperture wide-angle lens of the present invention preferably satisfies the following Conditions (3) and (4):

$-2 < f1/f < -0.95$      Condition (3)

$-1.1 < f4/f < -0.7$      Condition (4)

where f1 is the focal length of the first lens group I;

f4 is the focal length of the fourth lens group IV; and f is the focal length of the large aperture wide-angle lens.

If the upper limit of Condition (3) is not satisfied, coma aberration generated by the first lens group I cannot be corrected. If the lower limit of Condition (3) is not satisfied, the negative refractive power on the object-side of the wide-angle lens decreases to values that make it difficult to obtain a desired wide-angle of view.

If the upper limit of Condition (4) is not satisfied, the power of the fourth lens group becomes such that it is difficult to correct curvature of image plane aberration, also known as field curvature or curvature of field. Additionally, if the lower limit of Condition (4) is not satisfied, the distance between the object-side surface of the first lens group I and the image forming plane (the film surface 1) becomes so long that it is difficult to make a compact wide-angle lens. As indicated above, the first and fourth lens groups, I and IV, have negative refractive powers that lie in overlapping ranges as shown by Conditions (3) and (4). Balancing refractive powers so that both Conditions (3) and (4) are satisfied is necessary in order to obtain good optical performance.

To further assure excellent optical performance, in addition to satisfying Conditions (3) and (4), it is desirable that the following Conditions (3A) and (4A) that further restrict Conditions (3) and (4), respectively, be satisfied:

$-1.7 < f1/f < -1$      Condition (3A)

$-1.0 < f4/f < -0.8$      Condition (4A).

Furthermore, the compact large aperture wide-angle lens of the present invention is desirably constructed so that the following Conditions (5), (6), and (7) are also satisfied:

$v_{1d} < 45$      Condition (5)

$Nd_{3b} > 1.55$      Condition (6)

$V_{3bd} > 40$      Condition (7)

where $v_{1d}$ is the Abbe number at the d-line of a lens element having negative refractive power and having a concave surface on the object side of the first lens group I;

$Nd_{3b}$ is the refractive index at the d-line of a lens element of the third lens group III, namely, a lens element having positive refractive power and having a convex image-side surface; and $v_{3bd}$ is the Abbe number at the d-line of the same lens element of the third lens group III, namely, the lens element having positive refractive power and a convex image-side surface.

If Condition (5) above is not satisfied, the balance between lateral color and longitudinal chromatic aberration is destroyed, making correction of aberrations difficult. If Condition (6) above is not satisfied, spherical aberrations generated by the third lens group III (which, in the embodiments described below, has positive refractive power that exceeds the positive refractive power of the second lens group II) increase and correction becomes difficult. As with Condition (5), if Condition (7) above is not satisfied, the balance between lateral color and longitudinal chromatic aberration is destroyed, making correction of aberrations difficult.

To even further assure excellent optical performance, in addition to satisfying Conditions (5), (6), and (7), it is desirable that the following Conditions (5A), (6A), and (7A) that further restrict Conditions (5), (6), and (7), respectively, be satisfied:

$v_{1d} < 35$      Condition (5A)

$Nd_{3b} > 1.65$      Condition (6A)

$v_{3bd} > 50$      Condition (7A).

Three embodiments of the present invention will be individually described below with reference to the drawings.

In the three embodiments of the large aperture wide-angle lens of the present invention described below, the lens surfaces that are aspheric are defined using the following Equation (A):

$$Z = f\{(Y^2)/R\}/\{1 + (1 - K \cdot Y^2/R^2)^{1/2}\} + \Sigma(A_i \cdot Y^i)$$      Equation (A)

where

Z is the length (in mm) of a line drawn from a point on the aspheric lens surface at a distance Y from the optical axis to the tangential plane of the aspheric surface vertex, R is the radius of curvature (in mm) of the aspheric lens surface on the optical axis, Y is the distance (in mm) from the optical axis, K is the eccentricity, and $A_i$ is the ith aspheric coefficient, and the summation extends over i.

In Embodiments 1 and 2 of the invention described below, the aspheric coefficients $A_3$-$A_{20}$ are non-zero for the lens surfaces that are aspheric and all other aspheric coefficients are zero. In Embodiment 3 of the invention described below, aspheric coefficients $A_3$-$A_{20}$ are non-zero for the lens surfaces that are aspheric and all other aspheric coefficients are zero for two of the aspheric lens surfaces, and aspheric coefficients $A_3$-$A_{10}$ are non-zero for the lens surfaces that are aspheric and all other aspheric coefficients are zero for two of the aspheric lens surfaces. With regard to the aspheric surfaces of the present invention, in recent years there has been a demand for optical systems that provide high resolution, and based on improvements in computer performances in general, the conventional use of non-zero aspheric coefficients of low number and related to even number aspheric coefficients may be expanded to include also odd number aspheric coefficients and higher number aspheric coefficients up to number twenty. In this manner, by using non-zero aspheric coefficients which include odd numbered terms and non-zero aspheric coefficients up to number twenty, the parameters for determining an aspheric shape are increased. This, in turn, enables independently determining the shapes of the central region and peripheral region surrounding the optical axis of lens surfaces, thereby making it possible to perform excellent aberration correction in both the central region and the peripheral region.

In particular, in Embodiments 1 and 2 below, this enables the fourth lens element L4 (the first lens element from the object side of the third lens group III) to have decreasingly positive refractive power or increasingly negative refractive power toward the periphery, and enables the sixth lens element L6 (the first lens element from the object side of the fourth lens group IV) to have increasingly positive refractive power or decreasingly negative refractive power toward the periphery. In Embodiment 3, the features of lens elements L4 and L6 described above similarly apply to lens elements L3 and L5.

Embodiment 1

FIG. 1 shows a cross-sectional view of the large aperture wide-angle lens of Embodiment 1 of the present invention. As shown in FIG. 1, the large aperture wide-angle lens of Embodiment 1 includes, in order from the object side, the first lens group I having negative refractive power, the second lens group II having positive refractive power, the stop 2, the third lens group III having positive refractive power, and the fourth lens group IV having negative refractive power. In order from the object side, the first lens group I includes only lens element L1, the second lens group II includes only lens elements L2 and L3, the third lens group III includes only lens elements L4 and L5, and the fourth lens group IV includes only lens elements L6 and L7. A luminous flux that enters from the object side is efficiently focused on an image plane 1 of FIG. 1, where a photographic film may be located.

Within the first lens group I, the first lens element L1 is a biconcave lens element with its object-side surface of stronger curvature (i.e., smaller radius of curvature) than its image-side surface. Within the second lens group II, the second lens element L2 is a biconvex lens element with its object-side surface having a stronger curvature than its image-side surface. The third lens element L3 is a meniscus lens element of negative refractive power and having its concave object-side surface cemented to a convex surface of the second lens element L2 so as to form a lens component. Within the third lens group III, the fourth lens element L4 is a meniscus lens element of negative refractive power with its convex surface on the object side, and with both of its lens surfaces aspheric, and the fifth lens element L5 is a meniscus lens element of positive refractive power with its convex surface on the image-side. Within the fourth lens group IV, the sixth lens element L6 is a meniscus lens element of negative refractive power with both of its lens surfaces aspheric, and the seventh lens element L7 is a biconcave lens element with its object-side surface having a stronger curvature than its image-side surface.

Table 1 below lists the surface number # in order from the object side, the radius of curvature R (in mm) of each surface on the optical axis, the on-axis surface spacing D (in mm), as well as the refractive index $N_d$ and the Abbe number $v_d$ (both at the d-line of 587.6 nm) of each optical element for Embodiment 1. Listed in the bottom portion of Table 1 are the focal length f, the back focal length Bf, the f-number $F_{NO}$, and the half-field angle ω of Embodiment 1.

TABLE 1

| # | R | D | $N_d$ | $v_d$ |
|---|---|---|---|---|
| 1 | −22.46 | 0.90 | 1.64769 | 33.8 |
| 2 | 102.28 | 0.10 | | |
| 3 | 12.57 | 5.02 | 1.88300 | 40.8 |
| 4 | −21.08 | 0.70 | 1.84666 | 23.8 |
| 5 | −332.22 | 2.06 | | |
| 6* | 24.50 | 1.00 | 1.68893 | 31.1 |
| 7* | 18.20 | 2.74 | | |
| 8 | −26.91 | 4.00 | 1.72916 | 54.7 |
| 9 | −10.84 | 1.95 | | |
| 10* | −65.91 | 2.80 | 1.49023 | 57.5 |
| 11* | −211.14 | 1.48 | | |
| 12 | −14.65 | 1.00 | 1.57135 | 53.0 |
| 13 | 284.34 | | | | f = 24.06   Bf = 7.98   $F_{NO}$ = 1.96   ω = 41.8°

The surfaces with a * to the right of the surface number in Table 1 are aspheric lens surfaces, and the aspheric surface shape is expressed by Equation (A) above. As indicated in Table 1, both surfaces of lens elements L4 and L6 of the third lens group III and the fourth lens group IV, respectively, are aspheric.

Table 2 below lists the values of the constant K and the aspheric coefficients $A_3$-$A_{20}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 6 | −0.0867768 | −3.2687899E−4 | −5.1371436E−5 | −1.8183760E−4 | 3.7614388E−5 |
| 7 | −0.1761418 | −5.5296581E−5 | −6.8958799E−5 | 2.8464969E−5 | −3.0841506E−5 |
| 10 | −0.7463096 | 1.7672768E−3 | −1.3697066E−3 | 2.3434066E−4 | −1.4696107E−5 |
| 11 | 1.1897725 | 2.8600006E−3 | −1.6922662E−3 | 3.1371638E−4 | −3.9085035E−5 |

| # | $A_7$ | $A_8$ | $A_9$ | $A_{10}$ | $A_{11}$ |
|---|---|---|---|---|---|
| 6 | −6.1217814E−6 | 3.6482760E−7 | 2.5339980E−8 | −2.9629239E−9 | 1.6193746E−10 |
| 7 | 6.4059405E−6 | −4.5627477E−7 | −7.4763163E−9 | 3.7589133E−9 | 4.4219682E−11 |
| 10 | −2.6726938E−6 | 5.8166307E−7 | −5.1714746E−8 | 3.3108816E−9 | −9.3248550E−11 |
| 11 | 3.1387872E−6 | −2.5929509E−7 | 2.8790162E−8 | −2.3153645E−9 | 6.4159536E−11 |

TABLE 2-continued

| # | $A_{12}$ | $A_{13}$ | $A_{14}$ | $A_{15}$ | $A_{16}$ |
|---|---|---|---|---|---|
| 6 | 6.6172998E−12 | 8.3773899E−14 | −1.5306494E−14 | −2.9919374E−15 | −2.8418306E−16 |
| 7 | −1.3263706E−12 | −7.8275905E−13 | −3.0151401E−14 | −1.5839330E−15 | −2.8333679E−16 |
| 10 | −5.3821370E−12 | −2.4410086E−13 | 8.9853324E−15 | 1.7469691E−15 | 2.4056375E−16 |
| 11 | 1.4063930E−12 | 1.2240166E−13 | 2.5193301E−15 | −3.4131672E−15 | −1.5643113E−17 |

| # | $A_{17}$ | $VA_{18}$ | $A_{19}$ | $A_{20}$ |
|---|---|---|---|---|
| 6 | −2.3804089E−17 | −1.7565516E−18 | −8.8029849E−20 | 5.4685132E−21 |
| 7 | −2.6700946E−17 | −8.1626512E−19 | −1.1914021E−20 | 6.3534512E−21 |
| 10 | 6.3911149E−18 | 2.8280214E−18 | −1.6309097E−19 | −1.8068655E−20 |
| 11 | 2.6651905E−17 | −1.2726150E−18 | 3.4469932E−20 | −1.0397494E−21 |

Furthermore, the stop 2 is located along the optical axis X between the second and third lens groups II and III at the position where it serves as an aperture stop for the large aperture wide-angle lens of Embodiment 1, which is adjacent to and on the object-side of the fourth lens element L4 at a distance 0.90 mm from the object-side surface of the fourth lens element L4.

The large aperture wide-angle lens of Embodiment 1 satisfies Conditions (1)-(7) above, as set forth in Table 3 below.

TABLE 3

| Condition No. | Condition | Value |
|---|---|---|
| (1) | $1.7 < F_{NO} < 2.8$ | 1.96 |
| (2) | $0.77 < Y/f < 1.1$ | 0.899 (Y = 21.633, f = 24.06) |
| (3) | $-2 < f1/f < -0.95$ | −1.1784 (f1 = −28.353) |
| (4) | $-1.1 < f4/f < -0.7$ | −0.8837 (f4 = −21.262) |
| (5) | $v_{1d} < 45$ | 33.8 |
| (6) | $Nd_{3b} > 1.55$ | 1.72916 |
| (7) | $v_{3bd} > 40$ | 54.7 |

Figures 4A, 4B, 4C, 4D:
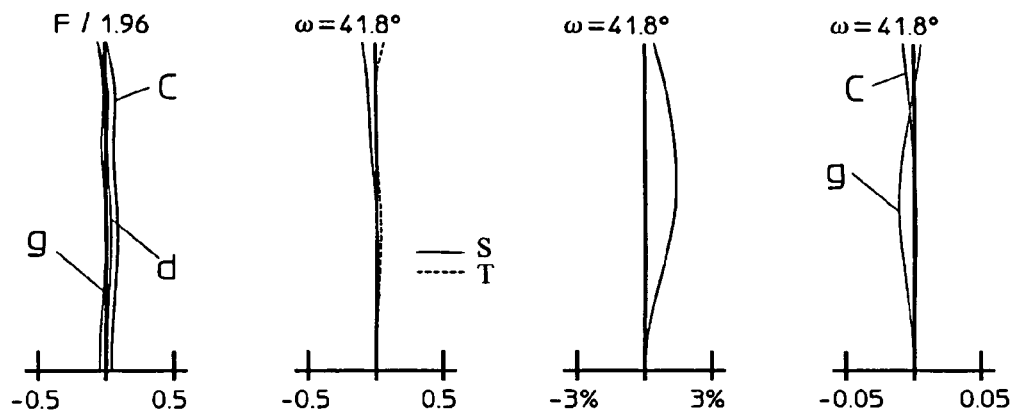
FIGS. 4A-4E show spherical aberration, astigmatism, distortion, lateral color, and coma, respectively, of the large aperture wide-angle lens of Embodiment 1 of the present invention.
Figure 4E:
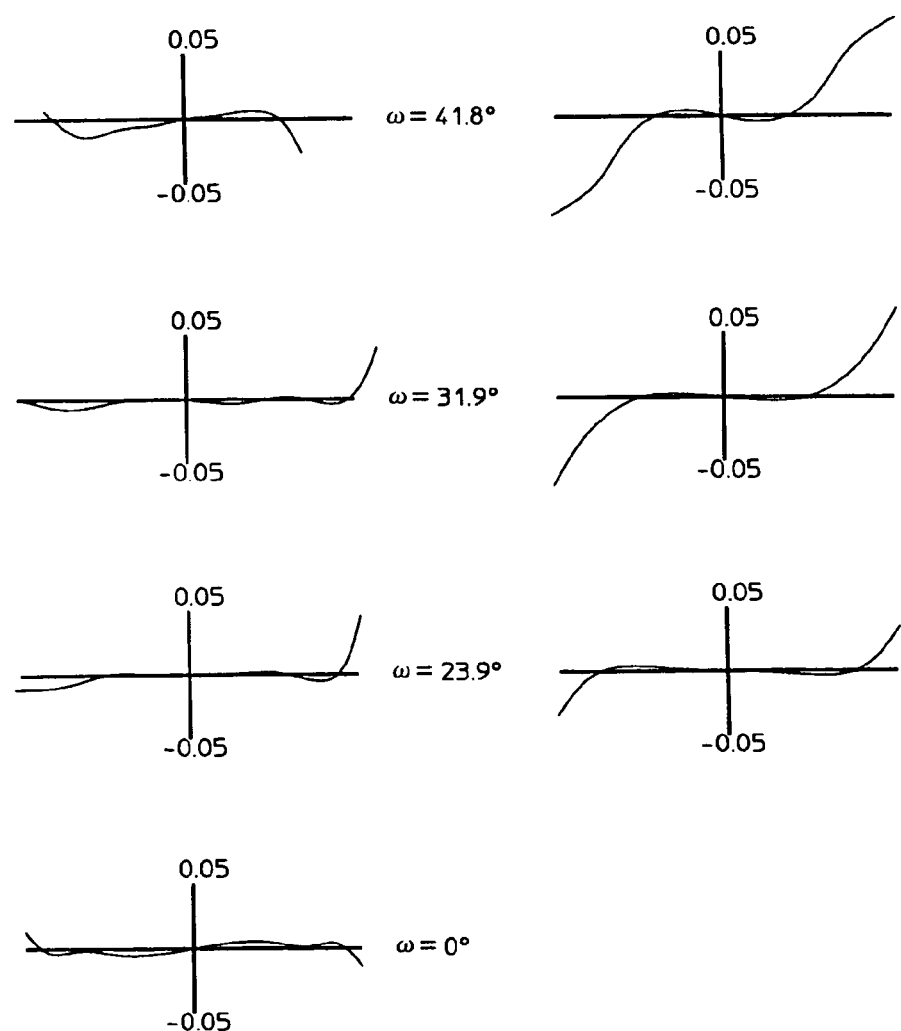

FIGS. 4A-4E show the spherical aberration, astigmatism, distortion, lateral color, and coma, respectively, of the large aperture wide-angle lens of Embodiment 1. In FIG. 4A, the spherical aberration (in mm) is shown for an f-number, $F_{NO}$, equal to 1.96 and for the wavelengths 587.6 nm (the d-line), 435.8 nm (the g-line), and 656.3 nm (the C-line). In the remaining figures, ω is the half-field angle. In FIG. 4B, the astigmatism (in mm) is shown for both the sagittal image surface S and the tangential image surface T and is measured at 587.6 nm (the d-line). In FIG. 4C, distortion (in percent) is measured at 587.6 nm (the d-line). In FIG. 4D, the lateral color (in mm) is shown for the wavelengths 435.8 nm (the g-line) and 656.3 nm (the C-line) relative to 587.6 nm (the d-line). FIG. 4E shows the coma (in mm) for various half-field angles ω for both the tangential (right column) and sagittal (left column) image surfaces.

As is clear from FIGS. 4A-4E and Tables 1-3 above, Embodiment 1 of the present invention provides a large aperture wide-angle lens with an f-number of 1.96, within the desired range, a focal length of very nearly 24 mm, and excellent correction of aberrations throughout the field of view.

Embodiment 2

Figure 2:
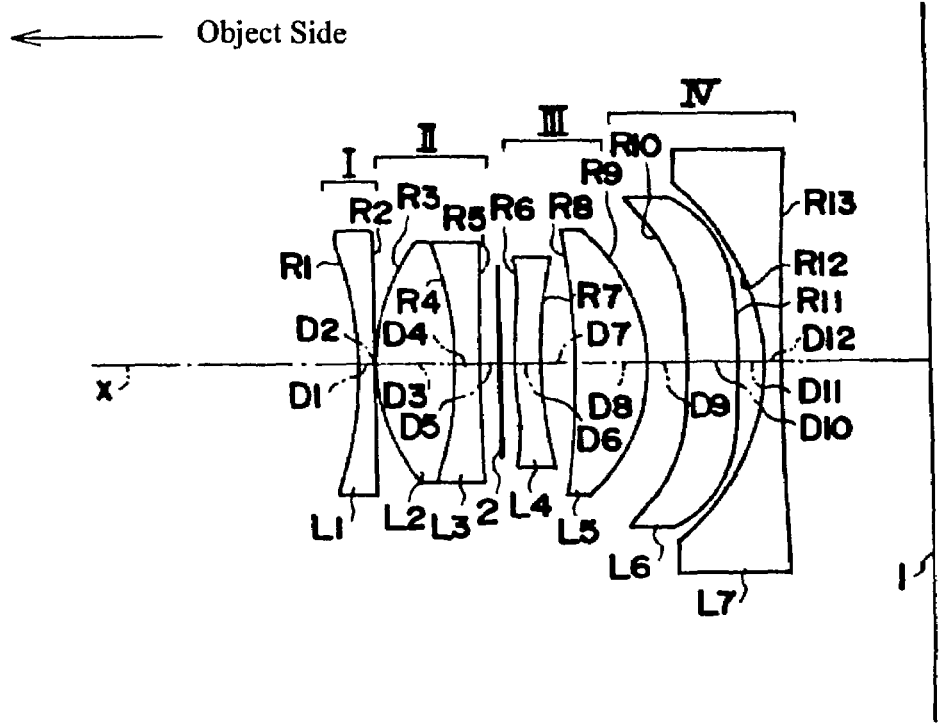
FIG. 2 shows a cross-sectional view of the large aperture wide-angle lens of Embodiment 2 of the present invention.

FIG. 2 shows a cross-sectional view of the large aperture wide-angle lens of Embodiment 2 of the present invention. Embodiment 2 is very similar to Embodiment 1 and uses the same number of lens components and lens elements. However, Embodiment 2 differs from Embodiment 1 in that in Embodiment 2, lens element L1 is a meniscus lens element having negative refractive power and the convex surface on the image side, and lens element L3 is a biconcave lens element having surfaces of different curvature and with its surface of stronger curvature on the object side.

Table 4 below lists the surface number # in order from the object side, the radius of curvature R (in mm) of each surface on the optical axis, the on-axis surface spacing D (in mm), as well as the refractive index $N_d$ and the Abbe number $v_d$ (both at the d-line of 587.6 nm) of each optical element for Embodiment 2. Listed in the bottom portion of Table 4 are the focal length f, the back focal length Bf, the f-number $F_{NO}$, and the half-field angle ω of Embodiment 2.

TABLE 4

| # | R | D | $N_d$ | $v_d$ |
|---|---|---|---|---|
| 1 | −22.28 | 0.90 | 1.83400 | 37.3 |
| 2 | −261.77 | 0.10 | | |
| 3 | 11.83 | 4.35 | 1.83500 | 43.0 |
| 4 | −19.29 | 1.30 | 1.76182 | 26.6 |
| 5 | 145.72 | 1.96 | | |
| 6* | 25.52 | 1.30 | 1.68893 | 31.1 |
| 7* | 20.02 | 1.99 | | |
| 8 | −45.20 | 4.00 | 1.58913 | 61.3 |
| 9 | −10.58 | 2.05 | | |
| 10* | −65.56 | 2.80 | 1.49023 | 57.5 |
| 11* | −211.15 | 1.41 | | |
| 12 | −13.78 | 1.00 | 1.51680 | 64.2 |
| 13 | 94.97 | | | | f = 24.08    Bf = 7.87    $F_{NO}$ = 1.98    ω = 41.8°

The surfaces with a * to the right of the surface number in Table 4 are aspheric lens surfaces, and the aspheric surface shape is expressed by Equation (A) above. As indicated in Table 4, both surfaces of lens elements L4 and L6 of the third lens group III and the fourth lens group IV, respectively, are aspheric.

Table 5 below lists the values of the constant K and the aspheric coefficients $A_3$-$A_{20}$ used in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{-2}$.

TABLE 5

| # | K | $A_3$ | $A_4$ | $A_5$ | $A_6$ |
|---|---|---|---|---|---|
| 6 | −0.0867781 | −7.2102825E−5 | −1.2745730E−4 | −1.7996678E−4 | 3.8972920E−5 |
| 7 | −0.1761413 | 5.9970773E−5 | −8.3128491E−5 | 3.2361594E−5 | −3.0872271E−5 |
| 10 | −0.7463096 | 1.3965068E−3 | −1.0269541E−3 | 1.3973523E−4 | −8.7167744E−6 |
| 11 | 1.1897726 | 3.1824487E−3 | −1.7966044E−3 | 3.2616692E−4 | −3.9207206E−5 |

| # | $A_7$ | $A_8$ | $A_9$ | $A_{10}$ | $A_{11}$ |
|---|---|---|---|---|---|
| 6 | −6.0963747E−6 | 3.6036021E−7 | 2.4760919E−8 | −2.9989610E−9 | 1.5955927E−10 |
| 7 | 6.4823636E−6 | −4.5025273E−7 | −7.2990527E−9 | 3.7397412E−9 | 4.0519913E−11 |
| 10 | −1.9469196E−6 | 5.6424014E−7 | −5.8539934E−8 | 2.9001334E−9 | −9.8223455E−11 |
| 11 | 2.8183783E−6 | −2.4860883E−7 | 3.24078342E−8 | −2.1304301E−9 | 4.4223254E−11 |

| # | $A_{12}$ | $A_{13}$ | $A_{14}$ | $A_{15}$ | $A_{16}$ |
|---|---|---|---|---|---|
| 6 | 6.5081821E−12 | 7.7625823E−14 | −1.5549864E−14 | −3.0010563E−15 | −2.8452680E−16 |
| 7 | −1.6685105E−12 | −8.1520316E−13 | −3.2369916E−14 | −1.7624550E−15 | −2.9452853E−16 |
| 10 | −2.1537340E−12 | 1.1070132E−13 | 3.3987027E−14 | 3.2895031E−15 | 2.8251477E−16 |
| 11 | −1.7609585E−12 | −1.8780084E−13 | 2.2572632E−15 | −2.4738071E−16 | 1.6679031E−16 |

| # | $A_{17}$ | $A_{18}$ | $A_{19}$ | $A_{20}$ |
|---|---|---|---|---|
| 6 | −2.3837890E−17 | −1.7594329E−18 | −8.8111650E−20 | 5.4746412E−21 |
| 7 | −2.7537973E−17 | −8.6692271E−19 | −1.5697868E−20 | 6.1339085E−21 |
| 10 | −1.3606491E−18 | 7.7955027E−19 | −2.7468082E−19 | −2.4315024E−20 |
| 11 | 4.9854376E−17 | −3.6054477E−18 | −1.4060856E−19 | 9.1141513E−21 |

Furthermore, the stop 2 is located along the optical axis X between the second and third lens groups II and III at the position where it serves as an aperture stop for the large aperture wide-angle lens of Embodiment 2.

The large aperture wide-angle lens of Embodiment 2 satisfies Conditions (1)-(7) above, as set forth in Table 6 below.

TABLE 6

| Condition No. | Condition | Value |
|---|---|---|
| (1) | $1.7 < F_{NO} < 2.8$ | 1.98 |
| (2) | $0.77 < Y/f < 1.1$ | 0.898 (Y = 21.633, f = 24.08) |
| (3) | $-2 < f1/f < -0.95$ | −1.2147 (f1 = −29.25) |
| (4) | $-1.1 < f4/f < -0.7$ | −0.8451 (f4 = −20.35) |
| (5) | $v_{1d} < 45$ | 37.3 |
| (6) | $Nd_{3b} > 1.55$ | 1.58913 |
| (7) | $v_{3bd} > 40$ | 61.3 |

Figures 5A, 5B, 5C, 5D:
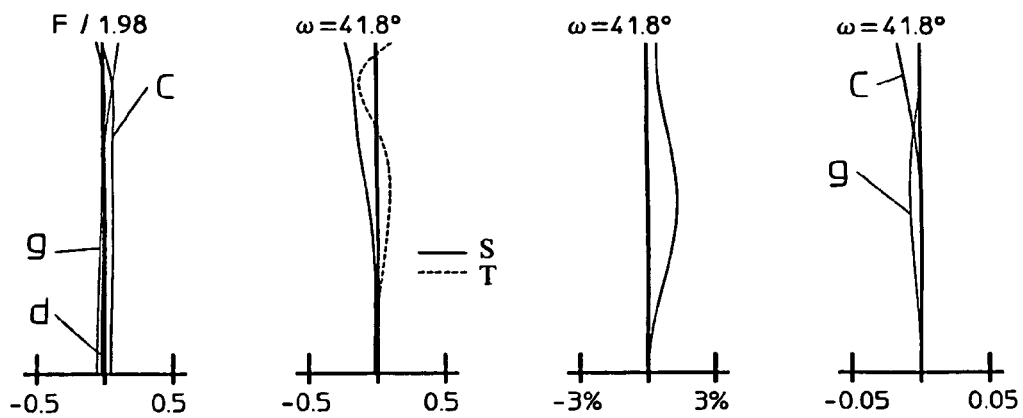
FIGS. 5A-5E show spherical aberration, astigmatism, distortion, lateral color, and coma, respectively, of the large aperture wide-angle lens of Embodiment 2 of the present invention.
Figure 5E:
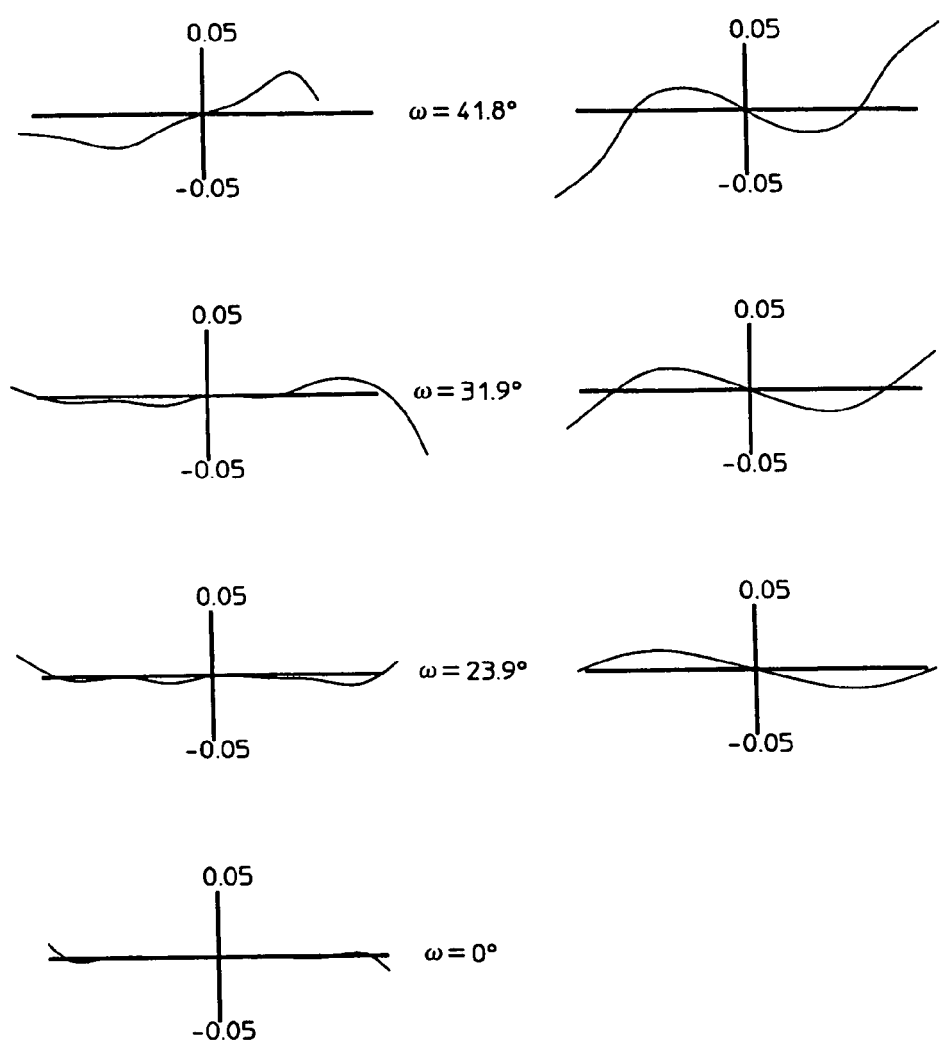

FIGS. 5A-5E show the spherical aberration, astigmatism, distortion, lateral color, and coma, respectively, of the large aperture wide-angle lens of Embodiment 2. In FIG. 5A, the spherical aberration (in mm) is shown for an f-number, $F_{NO}$, equal to 1.98 and for the wavelengths 587.6 nm (the d-line), 435.8 nm (the g-line), and 656.3 nm (the C-line). In the remaining figures, ω is the half-field angle. In FIG. 5B, the astigmatism (in mm) is shown for both the sagittal image surface S and the tangential image surface T and is measured at 587.6 nm (the d-line). In FIG. 5C, distortion (in percent) is measured at 587.6 nm (the d-line). In FIG. 5D, the lateral color (in mm) is shown for the wavelengths 435.8 nm (the g-line) and 656.3 nm (the C-line) relative to 587.6 nm (the d-line). FIG. 5E shows the coma (in mm) for various half-field angles ω for both the tangential (right column) and sagittal (left column) image surfaces.

As is clear from FIGS. 5A-5E and Tables 4-6 above, Embodiment 2 of the present invention provides a large aperture wide-angle lens with an f-number of 1.98, within the desired range, a focal length of very nearly 24 mm, and excellent correction of aberrations throughout the field of view.

Embodiment 3

Figure 3:
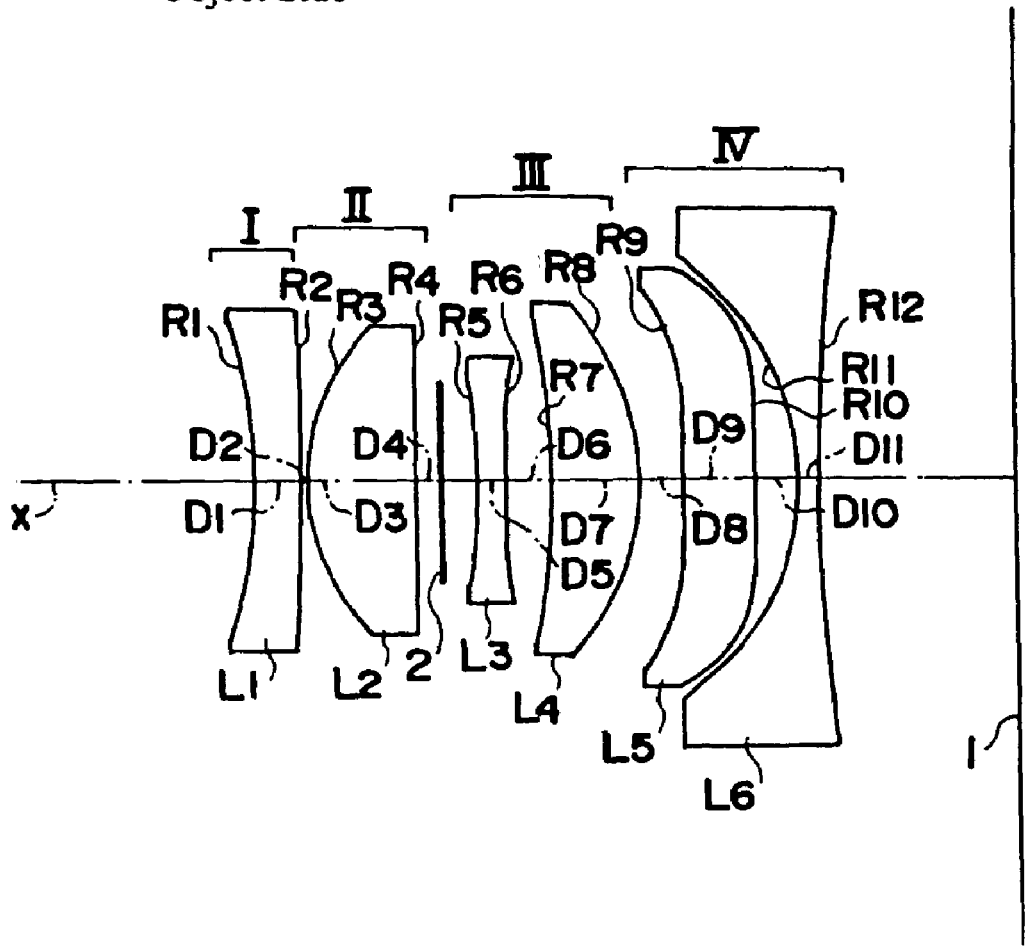
FIG. 3 shows a cross-sectional view of the large aperture wide-angle lens of Embodiment 3 of the present invention.

FIG. 3 shows a cross-sectional view of the large aperture wide-angle lens of Embodiment 3 of the present invention. Embodiment 3 is similar to Embodiment 1 and uses the same number of lens components but one less lens element and similarly provides an aperture stop between lens groups II and III. Embodiment 3 includes one less lens element than Embodiment 1 by lens group II of Embodiment 3 being formed as a single lens element.

In Embodiment 3, the first lens group I is formed as first lens element L1 that is a meniscus lens element having negative refractive power and the convex surface on the image side. The second lens group II is formed as a second lens element L2 that is a biconvex lens element having surfaces of different curvature and with its surface of stronger curvature on the object side. The third lens group III is formed as a third lens element L3 that is a biconcave lens element with two aspheric surfaces of different curvature and with its surface of stronger curvature on the object side, and a separate fourth lens element L4 that is a meniscus lens element of positive refractive power with its convex surface on the image side. The fourth lens group IV is formed as a fifth lens element L5 that is a biconcave lens element with two aspheric surfaces of different curvature and with the surface of stronger curvature on the object side, and a separate lens element L6 formed as a biconcave lens element having surfaces of different curvature with its surface of stronger curvature on the object side.

Table 7 below lists the surface number # in order from the object side, the radius of curvature R (in mm) of each surface on the optical axis, the on-axis surface spacing D (in mm), as well as the refractive index $N_d$ and the Abbe number $v_d$ (both at the d-line of 587.6 nm) of each optical element for Embodi ment 3. Listed in the bottom portion of Table 7 are the focal length f, the back focal length Bf, the f-number $F_{NO}$, and the half-field angle ω of Embodiment 3.

TABLE 7

| # | R | D | $N_d$ | $v_d$ |
|---|---|---|---|---|
| 1 | −24.72 | 1.90 | 1.80518 | 25.5 |
| 2 | −143.03 | 0.20 | | |
| 3 | 10.52 | 4.61 | 1.72916 | 54.7 |
| 4 | −596.10 | 2.53 | | |
| 5* | −44.69 | 1.20 | 1.68458 | 31.1 |
| 6* | 195.43 | 1.91 | | |
| 7 | −39.26 | 3.63 | 1.74400 | 44.9 |
| 8 | −12.42 | 1.85 | | |
| 9* | −624.66 | 3.00 | 1.49023 | 57.5 |
| 10* | 1284.95 | 1.74 | | |
| 11 | −12.85 | 1.00 | 1.54814 | 45.8 |
| 12 | 131.66 | | | |
| f = 24.09 | Bf = 7.85 | $F_{NO}$ = 2.42 | ω = 41.6° | |

The surfaces with a *to the right of the surface number in Table 7 are aspheric lens surfaces, and the aspheric surface shape is expressed by Equation (A) above. As indicated in Table 7, both surfaces of lens elements L3 and L5 of the third lens group III and the fourth lens group IV, respectively, are aspheric.

Table 8 below lists the values of the constant K and the aspheric coefficients $A_3$-$A_{20}$ used in Equation (A) above for each of the aspheric lens surfaces of Table 7. Aspheric coefficients that are not present in Table 8 are zero. An "E" in the data indicates that the number following the "E" is the exponent to the base 10. For example, "1.0E-2" represents the number $1.0 \times 10^{-2}$.

position where it serves as an aperture stop for the large aperture wide-angle lens of Embodiment 3, and it is adjacent to and on the object-side of the third lens element L3 at a distance of 1.50 mm from the object-side surface of the third lens element L3.

The large aperture wide-angle lens of Embodiment 3 satisfies Conditions (1)-(7) above, as set forth in Table 9 below.

TABLE 9

| Condition No. | Condition | Value |
|---|---|---|
| (1) | 1.7 < $F_{NO}$ < 2.8 | 2.42 |
| (2) | 0.77 < Y/f < 1.1 | 0.898 (Y = 21.633, f = 24.09) |
| (3) | −2 < f1/f < −0.95 | −1.5517 (f1 = −37.38) |
| (4) | −1.1 < f4/f < −0.7 | −0.8601 (f4 = −20.72) |
| (5) | $v_{1d}$ < 45 | 25.5 |
| (6) | $Nd_{3b}$ > 1.55 | 1.74400 |
| (7) | $v_{3bd}$ > 40 | 44.9 |

Figure 6A:
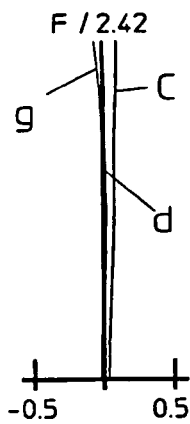
FIGS. 6A-6E show spherical aberration, astigmatism, distortion, lateral color, and coma, respectively, of the large aperture wide-angle lens of Embodiment 3 of the present invention.
Figure 6B:
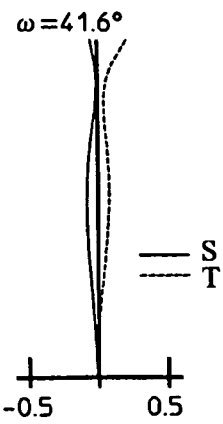
Figure 6C:
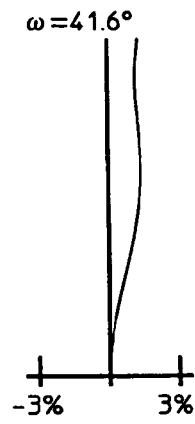
Figure 6D:
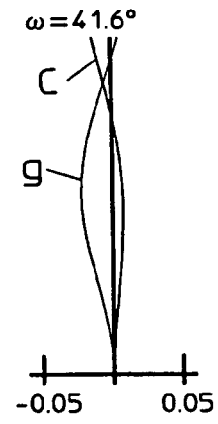

FIGS. 6A-6E show the spherical aberration, astigmatism, distortion, lateral color, and coma, respectively, of the large aperture wide-angle lens of Embodiment 3. In FIG. 6A, the spherical aberration (in mm) is shown for an f-number, $F_{NO}$, equal to 2.42 and for the wavelengths 587.6 nm (the d-line), 435.8 nm (the g-line), and 656.3 nm (the C-line). In the remaining figures, ω is the half-field angle. In FIG. 6B, the astigmatism (in mm) is shown for both the sagittal image surface S and the tangential image surface T and is measured at 587.6 nm (the d-line). In FIG. 6C, distortion (in percent) is measured at 587.6 nm (the d-line). In FIG. 6D, the lateral color (in mm) is shown for the wavelengths 435.8 nm (the g-line) and 656.3 nm (the C-line) relative to 587.6 nm (the

TABLE 8

| # | K | $A_3$ | $A_4$ | $A_5$ | $A_6$ |
|---|---|---|---|---|---|
| 5 | −0.0867823 | 8.4925121E−5 | −6.3368879E−4 | 3.9748866E−5 | 1.1784829E−5 |
| 6 | −0.1761525 | 2.0417571E−4 | −3.3849087E−4 | 9.1067197E−5 | −1.8592588E−5 |
| 9 | −0.7463097 | 1.8443179E−3 | −1.3927889E−3 | 2.8421979E−4 | −3.2450596E−5 |
| 10 | 1.1897716 | 2.1544101E−3 | −1.1283663E−3 | 1.2651211E−4 | −1.0681025E−5 |

| # | $A_7$ | $A_8$ | $A_9$ | $A_{10}$ | $A_{11}$ |
|---|---|---|---|---|---|
| 5 | −3.3611806E−6 | 5.1150505E−7 | 5.7792872E−9 | −4.7493293E−9 | 0 |
| 6 | 6.2185027E−6 | −4.9447108E−7 | −1.5816336E−8 | 3.7262411E−9 | 0 |
| 9 | −9.9636202E−7 | 6.3377599E−7 | −5.6679265E−8 | 2.3437470E−9 | −1.1539360E−10 |
| 10 | 1.3411412E−6 | −3.0533537E−7 | 3.4302728E−8 | −1.4935165E−9 | 1.8671721E−11 |

| # | $A_{12}$ | $A_{13}$ | $A_{14}$ | $A_{15}$ | $A_{16}$ |
|---|---|---|---|---|---|
| 9 | 8.2513151E−13 | −2.1214361E−14 | 1.9609618E−14 | 2.8407276E−15 | 2.2586692E−16 |
| 10 | −1.2599477E−12 | 6.0150785E−15 | 1.7544546E−16 | −3.2399074E−16 | −1.0113955E−17 |

| # | $A_{17}$ | $A_{18}$ | $A_{19}$ | $A_{20}$ |
|---|---|---|---|---|
| 9 | 1.1479230E−17 | −1.3398578E−19 | −1.4822994E−19 | −1.7775090E−20 |
| 10 | −1.0023839E−18 | −3.1733698E−20 | −1.4082113E−21 | 6.4196247E−21 |

According to Equation (A) above and the aspheric coefficients of Table 8 above, the third lens element L3 is provided with aspheric surfaces so that the refractive power of the third lens element L3 becomes more negative toward the periphery, and the fifth lens element L5 is provided with aspheric surfaces so that the refractive power of the fifth lens element L5 becomes more positive toward the periphery.

Figure 6E:
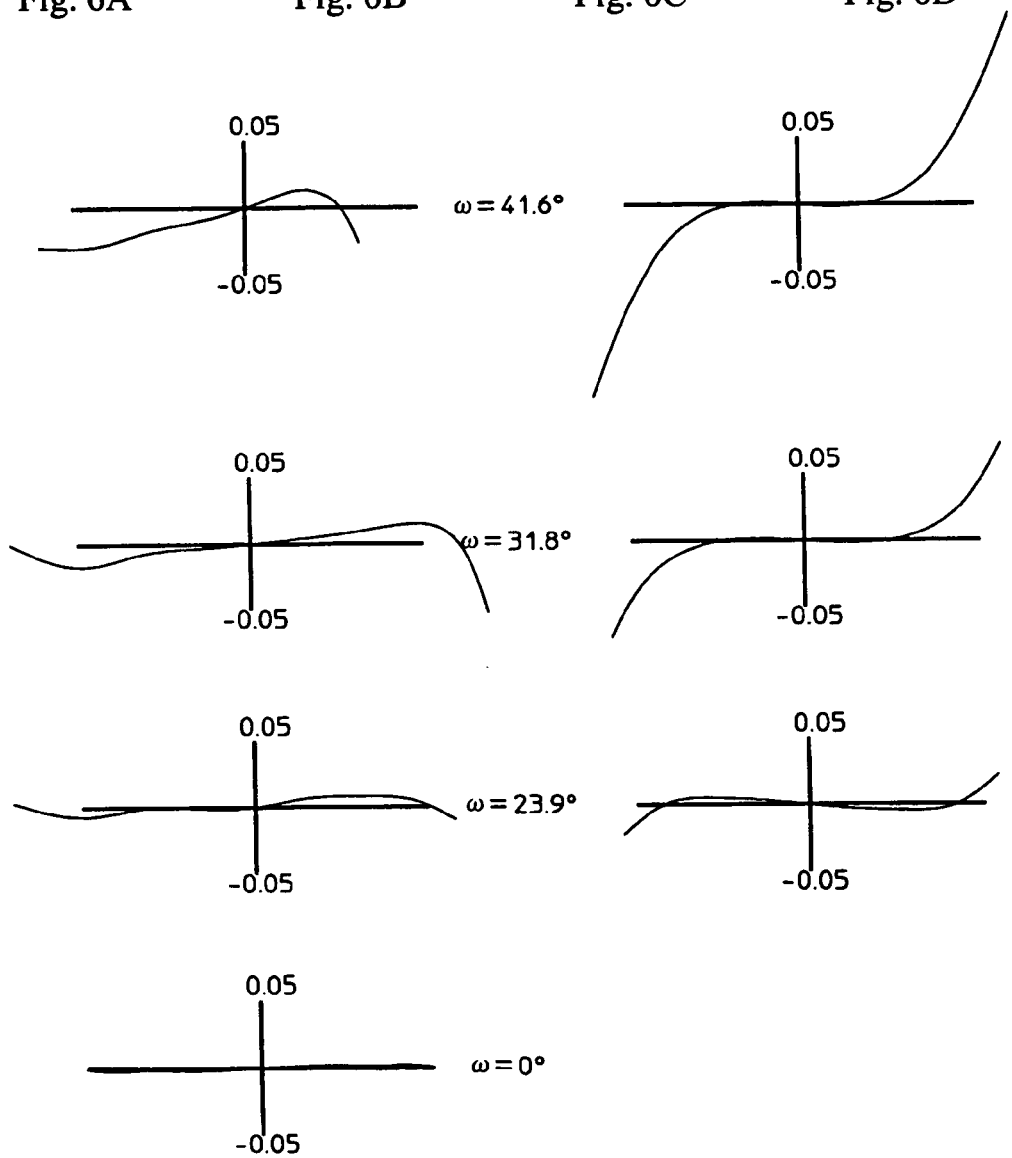

Furthermore, the stop 2 is located along the optical axis X between the second and third lens groups II and III at the d-line). FIG. 6E shows the coma (in mm) for various half-field angles ω for both the tangential (right column) and sagittal (left column) image surfaces.

As is clear from FIGS. 6A-6E and Tables 7-9 above, Embodiment 3 of the present invention provides a large aperture wide-angle lens with an f-number of 2.42, within the desired range, a focal length of very nearly 24 mm, and excellent correction of aberrations throughout the field of view.

By constructing the compact large aperture wide-angle lens of the present invention as described above of four lens groups, including using aspheric surfaces in the third and fourth lens groups, a large aperture wide-angle lens with an f-number smaller than 2.8 and a wide angle of view is provided. The lens provides a value of Y/f larger than 0.77 (see Condition (2) above), and high performance with only six or seven lens elements is obtained, and the lens element diameters and the back focal length are kept small. Particularly when used as the photographic lens of cameras using silver salt film, it becomes possible to take pictures with good picture quality at a brightness close to that of the eyes of a human being.

The invention being thus described, it will be obvious that the same may be varied in many ways. For instance, values such as the radius of curvature R of each of the lens elements, the surface spacing D, the refractive index $N_d$, as well as the Abbe number $v_d$, are not limited to the examples indicated in each of the aforementioned embodiments, as other values can be adopted. Also, lens elements that act as lens components may variously be modified as lens components that include more than one lens element, and the number of lens elements and lens components may be varied. Furthermore, a camera mounting the large aperture wide-angle lens of the present invention may make use of features of the lens of the present invention, such as the short back focus, small length for easy retraction, and small lens diameter, in order to produce a very compact camera. Additionally, the large aperture wide-angle lens of the present invention may be used with an image capturing device other than photographic film, such as a CCD image pickup device. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A wide-angle lens comprising four lens groups, arranged in order along an optical axis from an object side toward an image side and with no intervening lens component, as follows:
   a first lens group having negative refractive power;
   a second lens group having positive refractive power;
   a third lens group having positive refractive power; and
   a fourth lens group having negative refractive power;
   wherein
   said first lens group includes a lens element having negative refractive power and having a concave surface on the object side of said first lens group and said concave surface has a curvature larger in absolute value than the absolute value of the curvature of the surface on the image side of said lens element;
   said second lens group includes no more than two lens elements, no more than one of which has positive refractive power, and includes a convex surface on the object side;
   said third lens group includes at least one aspheric surface and an image-side lens component having positive refractive power that has a convex image-side surface;
   said fourth lens group has a concave object-side surface and includes at least one aspheric surface; and
   the following conditions are satisfied:

$1.7 < F_{NO} < 2.8$ $0.77 < Y/f < 1.1$ where
   $F_{NO}$ is the f-number of the wide-angle lens;
   Y is the maximum image height at the image plane of the wide-angle lens; and
   f is the focal length of the wide-angle lens.

2. The wide-angle lens of claim 1, wherein said second lens group includes only a single lens component that is formed of, arranged in order along the optical axis from the object side, a lens element having positive refractive power and a lens element having negative refractive power that is cemented to said lens element having positive refractive power.

3. The wide-angle lens of claim 2, wherein said third lens group includes, arranged in order along the optical axis from the object side, a lens component having negative refractive power that includes said aspheric surface and a lens component having positive refractive power and having on the image side a surface that is convex and of a curvature that is larger in absolute value than the absolute value of the curvature of the surface on the object side of the lens component having positive refractive power.

4. The wide-angle lens of claim 3, wherein the refractive power of said aspheric surface of said third lens group becomes more negative from the optical axis toward the periphery.

5. The wide-angle lens of claim 1, wherein said fourth lens group includes only, arranged in order along the optical axis from the object side, a lens component that includes an aspheric surface and a lens component having negative refractive power and having a concave object-side surface with a refractive power of absolute value greater than the absolute value of the refractive power of the image-side surface.

6. The wide-angle lens of claim 5, wherein said aspheric surface of said fourth lens group has increasingly positive refractive power or decreasingly negative refractive power from the optical axis toward the periphery.

7. The wide-angle lens of claim 6, wherein said lens component that includes an aspheric surface of said fourth lens group is made of plastic.

8. The wide-angle lens of claim 1, wherein the following conditions are satisfied:

$-2 < f1/f < -0.95$ $-1.1 < f4/f < -0.7$ where
   f1 is the focal length of said first lens group; and
   F4 is the focal length of said fourth lens group.

9. The wide-angle lens of claim 1, wherein the following conditions are satisfied:

$v_{1d} < 45$ $Nd_{3b} > 1.55$ $v_{3bd} > 40$ where
   $v_{1d}$ is the Abbe number at the d-line of said lens element of said first lens group;
   $Nd_{3b}$ is the refractive index at the d-line of a lens element having positive refractive power and a convex image-side surface of said third lens group; and
   $v_{3bd}$ is the Abbe number at the d-line of said lens element having positive refractive power and a convex image-side surface of said third lens group.

10. The wide-angle lens of claim 1, wherein a stop is provided between said second lens group and said third lens group.

11. A camera including the wide-angle lens of claim 1.

12. The wide-angle lens of claim 1, wherein the wide-angle lens includes only six lens components.

13. The wide-angle lens of claim 2, wherein the wide-angle lens includes only six lens components.

14. The wide-angle lens of claim 3, wherein the wide-angle lens includes only six lens components.

15. The wide-angle lens of claim 4, wherein the wide-angle lens includes only six lens components.

16. The wide-angle lens of claim 5, wherein the wide-angle lens includes only six lens components.

17. The wide-angle lens of claim 6, wherein the wide-angle lens includes only six lens components.

18. The wide-angle lens of claim 7, wherein the wide-angle lens includes only six lens components.

19. The wide-angle lens of claim 8, wherein the wide-angle lens includes only six lens components.

20. The wide-angle lens of claim 9, wherein the wide-angle lens includes only six lens components.

* * * * *